United States Patent [19]

Josephson

[11] Patent Number: 5,311,255
[45] Date of Patent: May 10, 1994

[54] REAL-TIME DIAGNOSTIC SYSTEM FOR DETECTING NON-LINEAR MOVEMENT OF AN IMAGING MEMBER USING OPTICAL FIBERS

[75] Inventor: Donad M. Josephson, Rochester, N.Y.

[73] Assignee: Eastman Kodak Company, Rochester, N.Y.

[21] Appl. No.: 58,198

[22] Filed: May 4, 1993

[51] Int. Cl.⁵ .............................................. G03G 15/00
[52] U.S. Cl. ................................... 355/206; 355/209; 346/33 MC
[58] Field of Search ............... 355/202, 206, 209, 244, 355/203, 1; 371/15.1, 16.4; 358/406; 348/33 MC

[56] References Cited

U.S. PATENT DOCUMENTS

| | | | |
|---|---|---|---|
| 2,971,808 | 2/1961 | Aller et al. | 346/33 MC |
| 3,893,175 | 7/1975 | Solomon | 360/6 |
| 4,008,954 | 2/1977 | Ogawa et al. | 355/1 |
| 4,062,061 | 12/1977 | Batchelor et al. | 364/900 |
| 4,739,366 | 4/1988 | Braswell et al. | 355/14 |
| 4,855,754 | 8/1989 | Tanaka et al. | 346/17 |
| 5,018,143 | 5/1991 | Platteter et al. | 371/16.4 |
| 5,053,815 | 10/1991 | Wendell | 355/208 |
| 5,175,628 | 12/1992 | Jamzadeh et al. | 358/300 |

FOREIGN PATENT DOCUMENTS 1-92766  4/1989  Japan .................... 355/209

Primary Examiner—Joan H. Pendegrass
Attorney, Agent, or Firm—Dennis R. Arndt

[57] ABSTRACT

A diagnostic method and apparatus for use in an electronic printer or reproduction machine having a movable imaging member capable of receiving an image from a modulated light source. A plurality of light sources are mounted adjacent the imaging member. Each light source is illuminated in parallel with the activation of a corresponding machine component. The activation of the light sources results in a plurality of timing marks on the imaging member and subsequently on the printed sheet such that the length of each line corresponds to the time the parallel machine component was activated.

4 Claims, 8 Drawing Sheets

The legendary kite experiment did, in fact, take place in June, 1752. Franklin gave a brief and cryptic account in his Autobiography. But it was Joseph Priestly who told the details fifteen years later in his two-volume History and Present State of Electricity - the 18th century's definitive work on the subject.

Actually, Franklin was beaten to the punch. It was in 1749 that he first suggested the "sameness of lightning with electricity." A DEFECT→year later, Franklin communicated to Peter Collinson of the Royal Society the details of how the theory might be experimentally verified. Another two years passed before the paper was published in Paris, but then the experiment was immediately carried out: Messieurs Jean Dalibard and Delor, carefully following Franklin's instructions, drew sparks to a pointed rod during a thunderstorm in May, 1752 - one month before Franklin's kite flying episode.

In Russia, another experimenter, the Swede George Wilhelm Richmann, failed to ground his apparatus - as Franklin had suggested - and paid the consequences: A spark nearly a foot long leaped from the rod to Richmann's head and made him the first martyr to the new science.

FIG. 6

The legendary kite experiment did, in fact, take place in June, 1752. Franklin gave a brief and cryptic account in his Autobiography. But it was Joseph Priestly who told the details fifteen years later in his two-volume History and Present State of Electricity - the 18th century's definitive work on the subject.
Actually, Franklin was beaten to the punch. It was in 1749 that he first suggested the sameness of lightning with electricity." A year later, Franklin communicated to Peter Collinson of the Royal Society the details of how the theory might be experimentally verified. Another two years passed before the paper was published in Paris, but then the experiment was immediately carried out: Messiers Jean Dalibard and Delor, carefully following Franklin's instructions, drew sparks to a pointed rod during a thunderstorm in May, 1752 - one month before Franklin's kite flying episode.
In Russia, another experimenter, the Swede George Wilhelm Richmann, failed to ground his apparatus - as Franklin had suggested - and paid the consequences: a spark nearly a foot long leaped from the rod to Richmann's head and made him the first martyr to the new science.

FIG. 8

REAL-TIME DIAGNOSTIC SYSTEM FOR DETECTING NON-LINEAR MOVEMENT OF AN IMAGING MEMBER USING OPTICAL FIBERS

TECHNICAL FIELD OF THE INVENTION

The invention relates primarily to reprographic machines and image writers doing line-by-line writing, and more particularly, to improved low-cost diagnostic capability using fiber optic technology during the exposure cycle of the machines.

BACKGROUND OF THE INVENTION

The advent of higher speed and more complex copiers and reproduction machines that generate an image on a line-by-line basis brought with it a corresponding increase in the complexity of machine control wiring and logic. While this complexity manifests itself in many ways, perhaps the most onerous involves the inflexibility of the typical control logic/wiring systems. For it to be appreciated, simple unsophisticated machines with relatively simple control logic and wiring can be altered and modified easily to incorporate changes, retrofits and the like. Servicing and repair of the control logic is also fairly simple. On the other hand, some modern high speed machines which often include a sorter, a document handler, choice of copy sites, multiple paper trays, jam protection and the like, have extremely complex logic systems making even the most minor changes and improvements in the control logic difficult, expensive and time consuming. In servicing or repairing the machine control logic paper handling systems, electromechanical components, etc., may similarly entail substantial difficulty, time and expense.

Nonetheless, the maintenance of complex reproduction machines has become an increasingly important aspect in the commercial reproduction and sale of such machines. As these machines grow larger, more complex, faster and more expensive, it has become increasingly important to take measures ensuring the machines continue reliable operation. As these machines are indispensable to their users, an increasingly important feature of such machines is their reliability. When a machine does malfunction, it is desirable that it be fixed in as short a time as possible.

As a result of these needs, much work has been done to improve the on-board diagnostic capability of these machines. With such a machine capability, a service representative, or a trained user can easily and quickly determine the causes of the malfunction. In the case of a service representative, based on such diagnostic report from the machine, action may be taken to effectuate an appropriate repair.

In a complex piece of hardware such as a copier or reproduction machine, it is difficult to tell if various machine functions are happening in the proper sequence. Usually sensors, switches, valves and motors are monitored by an internal computer and fault conditions are recorded for later playback by a service person. This record enables the service person to quickly identify the source of the problem and repair it. This type of apparatus is disclosed in U.S. Pat. Nos. 4,062,061 and 4,739,366. The drawback of such an apparatus is that it requires additional equipment to display and analyze the stored data, usually at a later time. Also, such data are difficult to directly relate to the actual image on the paper, should an image artifact occur.

In a laser copier or laser printer, it is extremely important to maintain a smooth rotation of the exposing drum during the time that the image is being recorded. Any machine vibration or change in velocity will cause an artifact in the final output copy that will appear as a dark or light band. It is usually very difficult to determine the source of these velocity perturbations. Usually, a record is made of all the time durations of machine component activations and this record is analyzed to determine if any activations occurred at the same time as the artifact. It is not a simple task to correlate the simple relationships back to the final paper image.

SUMMARY OF THE INVENTION

The present invention uses a simple lens system or fiber optics to record timing information associated with machine functions directly onto the imaging surface so that these relationships can be seen after the image is transferred onto paper. An image artifact caused by a sticking clutch, for example, could be readily associated with the end of the timing mark representing the clutch operation. To do so with stored timing information would be much more difficult and require more complex equipment.

The present invention solves the problem of comparing multiple timing relationships by exposing the machine timing diagram directly onto the copy of the print. No extra computers or memory devices are required.

Using fiber optic transmitters or light sources electrically activated to correspond to the various machine functions and a short length of fiber optic cable, it is possible to expose a series of marks onto the imaging element of the copier so that the timing of these various events will be permanently recorded on the paper. Similar marks can be recorded using only the light sources and a simple lens. Because the marks from the light sources are imaged as the corresponding machine functions are occurring, their relationship to an image defect as seen on the paper will be easier to identify. This method of event recording can easily identify a seemingly unrelated event with an image artifact. For example, a vibration caused by a paper supply motor turning on could cause a density band on the paper image. By using this direct recording technique and connecting the motor control signal to one of the light sources, the resultant timing mark exposed on the paper would directly correlate with the density band. Repairs could then be made to the motor to reduce the excess vibrations.

This invention can also be used during development of a copier or reproduction machine. The initial timing relationships can be adjusted experimentally and the resultant image and timing diagrams can be analyzed immediately as the print is exited from the machine. Image artifacts can be traced to the offending component much quicker without the expense of electronic analyzers.

The present invention provides a diagnostic apparatus for use in a reproduction machine having a movable imaging member capable of receiving an image and means for writing an image on the imaging member. The apparatus comprising at least one light source adjacent said imaging member and means for activating each source to be illuminated with the corresponding activation of at least one machine component wherein said activated light source makes a line on said imaging member with the length of the line representing the elapsed time the corresponding machine component was activated.

The invention, and its objects and advantages, will become more apparent in the detailed description of the preferred embodiment presented below.

BRIEF DESCRIPTION OF THE DRAWINGS

In the detailed description of the preferred embodiments of the invention presented below, reference is made to the accompanying drawings, in which:

FIG. 6 illustrates a similar image with an image artifact caused by a machine malfunction or vibration that occurred during the exposure portion of the machine cycle;

FIG. 8 illustrates the timing marks exposed on top of a typical image illustrates the association of the image artifact with the energizing of a machine component represented by the timing mark;

DETAILED DESCRIPTION OF THE INVENTION

Figure 1:
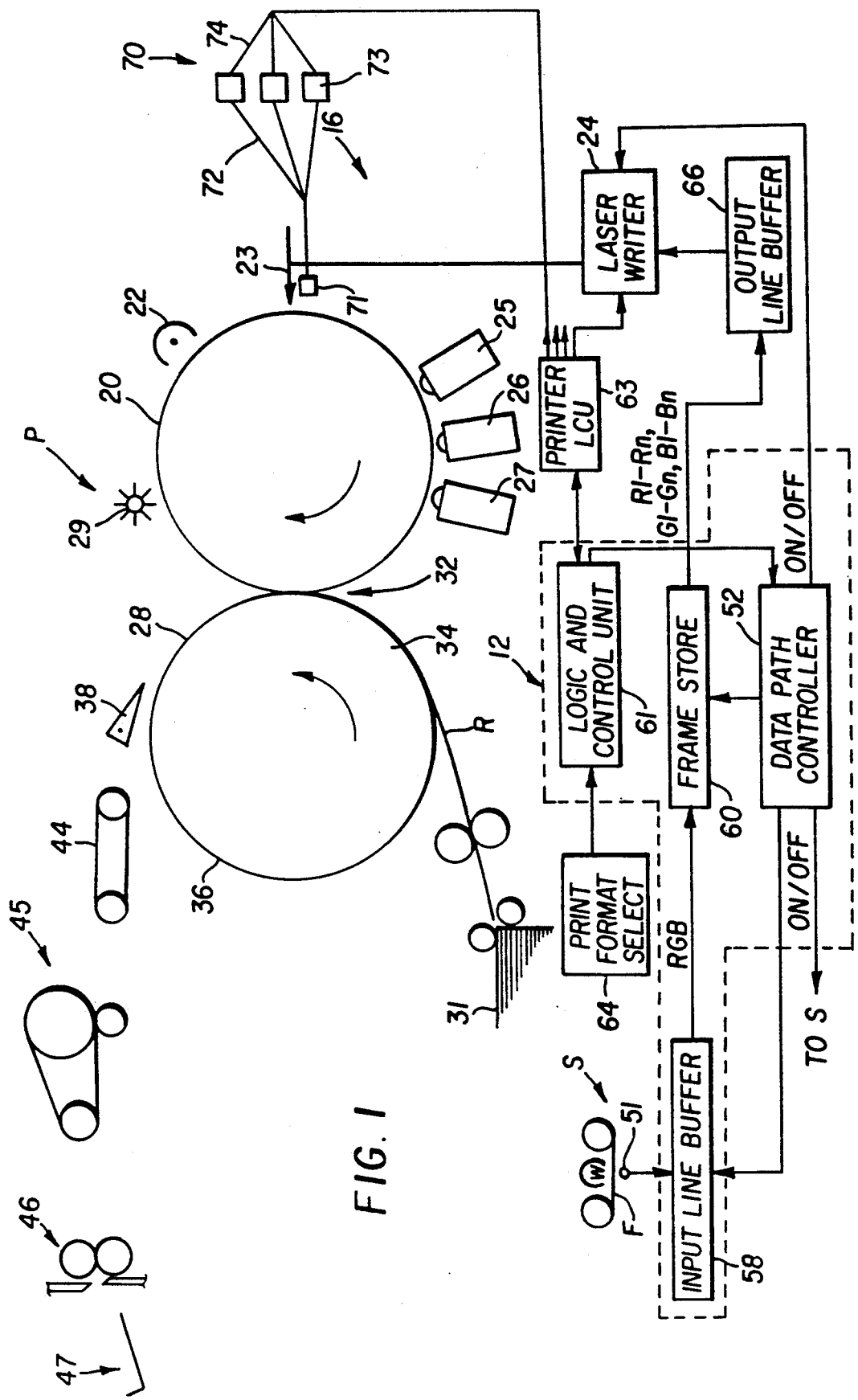
FIG. 1 is a general schematic illustration of an exemplary electronic printing apparatus for carrying out the generation of prints, in accordance with this invention.
Figure 2:
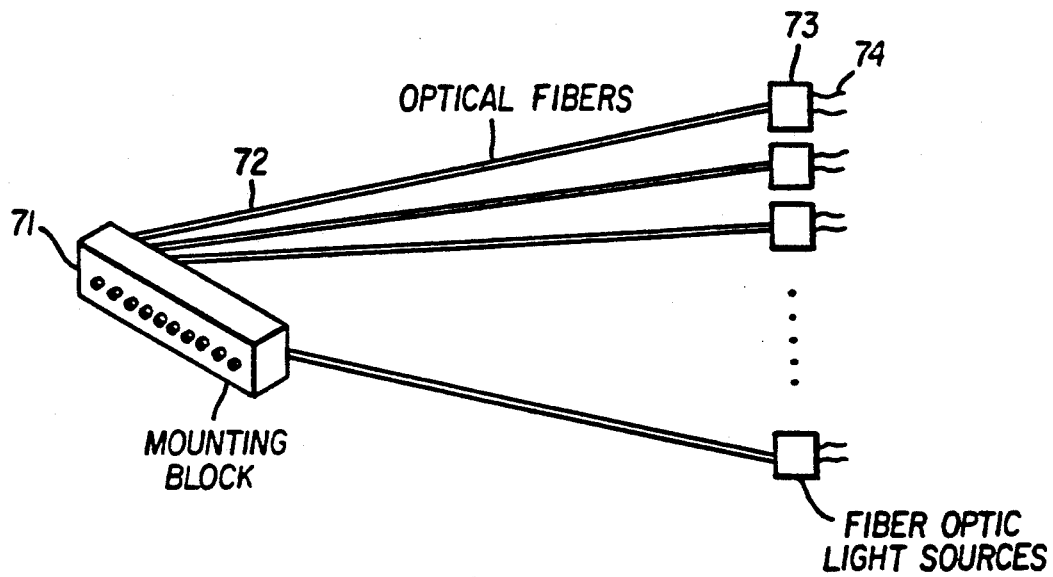
FIG. 2 is a detailed view of the mounting block and fiber optic assembly shown in FIG. 1.

The following discussion of electronic printing is presented as a general background to enable a full understanding of the illustrated embodiment of the instant invention. In order to utilize electronic printing for reproducing images from an array of multicolored images contained on a filmstrip or the like, the filmstrip must be scanned by an electronic color scanner which conventionally includes, for example, a color-responsive CCD (charged couple device) (such as shown in U.S. Pat. Nos. 4,638,371 or 4,639,769). The scanner operates to produce line-by-line and pixel-by-pixel (a pixel is defined as a picture element), electronic signals representing the color content of each image contained in the scanned filmstrip. The signals are stored in a framestore such as described in U.S. Pat. No. 5,175,628, issued Dec. 29, 1992 in the name of Jamzadeh et al) to enable subsequent driving of an exposure device in an electronic printer. Electronically produced signals are also capable of being used for storage of an array of multicolored images (contained in an original filmstrip or the like) on alternative storage means such as still video, floppy or a video disc. Image regeneration devices are then required to read out the stored signals from the alternative storage medium for display, for example, on a cathode ray tube (CRT) or a standard television set. It is desirable to make a print on a single print receiver sheet for a complete array of filmstrip frame images so that the images are readily viewable. Such a single print receiver sheet bearing the complete array of filmstrip frame images is referred to as an "index". That is, when providing prints from a filmstrip contained on an array (i.e., series) of images, or when an array of images is stored on alternative storage media, it is advantageous to provide the customer with a single sheet (the index print) containing all of the images, included with the image prints or the alternative storage media.

In the production of the index print according to the aforementioned, the index print, for an array of image frames contained on a filmstrip (or video disc) or the like is accomplished by pre-scanning, at low resolution, an array of multicolor images contained on frames of a filmstrip or the like. Information data, obtained during the low resolution pre-scan, of scene content of respective image frames, and additional information data on at least one of where frames of the array are located in the filmstrip, that type of filmstrip is being scanned, the total number of frames on the filmstrip, and what are the conditions of each frame are stored. Look-up tables based on the stored information data are defined in the stored information data is processed with the defined look-up tables to produce prints of the array of multicolored images. Prints running thereafter would be produced, at high resolution, are respective print receiver sheets or, at low resolution, as an index print, on a single print receiver sheet, and the additional information data may be printed in association with the respective image prints on the individual print receiver sheets or the index print.

The electrophotographic color printer P comprises a reusable image recording element, for example, a photoconductive recording member in the form of a drum 20. The drum 20 is rotated by a motor (not shown) in a clockwise direction (as viewed in FIG. 1) past a series of processing stations, all of which are well known in the art. These stations include a charging station 22 which operates to uniformly charge the photoconductive surface of the drum 20, and an exposure station 23. The exposure station 23 imagewise exposes the uniformly charged surface to create a developable latent electrostatic images thereon. The exposure station may comprise the conventional LED printhead with ion-depositing head, or as schematically shown, a laser writer 24.

As drum 20 rotates, the intensity of the output being of laser writer 24 is modulated with color-separated image information data, whereby a series of latent electrostatic images are produced on the drum's surface, each representing a color-separated image of the ultimately desired multicolor print. The series of electrostatic images on drum 20 is rendered visible with different color marking particles (e.g., cyan, magenta and yellow toner), by development stations 25, 26 and 27 to produce a series of related toner images. These color-separated toner images are then transferred in registration to the print receiver sheet R carried on the periphery of a transfer drum 28. The photoconductive drum 20 is sequentially cleaned at a cleaning station 29 and recycled to the electrophotographic image-forming process.

Print receiver sheets R are fed seriatim, from a sheet supply 31 to an image-transfer station 32 defined by the nip between drum 20 and transfer drum 28. As each sheet approaches the image-transfer station 32, it is secured to the transfer drum 28 by vacuum means, gripping fingers or other suitable mechanisms. For example, the leading edge of the sheet can be secured to the transfer drum 28 by vacuum through a row of vacuum ports 34 and the trailing end by vacuum through a row of vacuum ports 36. During each rotation of the transfer drum 28, one color-separated toner image is transferred to a receiver sheet, for example, by heating the receiver sheet to a degree sufficient to soften the toner and tack the toner to the receiver sheet. Examples of this are shown in U.S. Pat. Nos. 4,968,578, issued Nov. 6, 1990 in the name of Light; 4,927,727, issued May 22, 1990 in the names of Rimai et al; and 5,021,835, issued Jun. 4, 1991 in the name of Johnson et al.

After the transfer drum 28 has made three (four) revolutions and three related color-separated toner images (plus a black image if a fourth revolution is employed) have been transferred, in superimposed registration, to the surface of a print receiver sheet R, the leading edge of the receiver sheet is stripped from the transfer drum 28 by stripping mechanism 38. The print receiver sheet R is transported by further rotation of the transfer drum 28 onto a sheet transport 44 which carries it to a fusing device 45 where the transferred images are fixed to the sheet by heat and/or pressure, for example. The print receiver sheet R is then cut by any suitable cutting mechanism 46 to provide a plurality of smaller prints, each containing a reproduction of a single multicolored image frame. The resultant prints are collected in a tray 47 or more sophisticated print collection device of any well known type from the art.

The input signals to exposure station 23 are provided by conventional electronic color scanner S which includes a color-responsive CCD 51 (such as shown, for example, in aforementioned U.S. Pat. Nos. 4,638,371 and 4,639,769). Scanner S operates to scan an original multicolor 35 mm image such as a filmstrip F which is moved past a scanner by any one well known drive mechanism (not shown). The scan is accomplished line-by-line and pixel-by-pixel, to produce three color-separated signals, R, G and B representing the color content of each of the scanned image frames in three spectral regions, i.e., the red (R), green (G) and blue (B) spectral regions. These R, G and B color-separated signals are produced substantially simultaneously and, as they are produced, they are fed to a framestore 60 by an input line buffer 58 of an image data manager 12. The latter serves to buffer a few lines of image data to account for any electronic protocol (SCSI communications) any latencies at the scanner-framestore interface, and a look-up table needs inside the filmstrip scanner S.

A logic and control unit (LCU) 61 operates through a datapath controller 62 to control the flow of data into and out of the framestore 60, and manage the whereabouts of data in the framestore (i.e., provide a bookkeeping function). The LCU 61 also cooperates with a logic and control unit (LCU) 63 for the electrophotographic color printer P. The LCU receives inputs from various portions of the electrophotographic color printer, including encoders (not shown) associated with the photoconductive transfer drums (20 and 28, respectively), and transducers associated with the various processing stations to manage the timing of the entire printing process for such an apparatus.

LCU 63 also controls the fiber optic writers which are shown generally at 70 and are comprised of a plurality of light sources 73 which are connected to the LCU 63 via transmitter input lines 74 which receives machine component control signals from LCU 63. A length of optical fiber 72 is connected to each light source 73 and extends to a mounting block 71 which holds the end of each fiber adjacent the photoconductive surface of the drum 20 in a properly spaced fashion for imaging the light onto the surface of the drum 20. Each transmitter input 74 is connected to a different machine control signal that needs to be monitored. As the signals associated with the activation of machine components, the corresponding light sources will be turned on and off, respectively. The optical fibers carry the light to the photosensitive surface of the machine where the motion of the photosensitive surface causes the light to form vertical streaks on the image. The light will expose several marks from several different signals onto the surface that will be toned and transferred to the paper at a later time.

This device can be used on any machine that uses a photosensitive surface in its normal operation. Examples include xerographic copiers, laser copiers, laser printers, light valve photographic printers, cathode ray tube photographic printers, and LED photographic printers. When used on a machine with color capabilities, the timing marks generated on each separation will be "color coded" to further aid in the diagnosis of artifacts. Accordingly, this results in a machine component that is active only during the yellow exposure cycle producing a mark that is yellow in color.

The fiber optic diagnostic apparatus of this type can be used to help determine the source of several image artifacts that would appear in the finished print, even small image defects would become readily apparent. The latent image is formed on the photosensitive surface as it is rotated past the scanning laser. Any non-uniform motion of the photosensitive surface relative to the scan line during the exposure of the image will result in a darker or lighter band at that position on the image. This non-uniform motion is usually the result of a vibration caused by the activation of another machine component. Determining which component is the offending one can be very difficult. The use of the present invention to expose marks on the image surface during image recording simplifies the search for the offending vibration. Examination of the finished print with timing marks exposed along the image, the corresponding machine functions are represented. It then becomes evident which machine component was energized or turned off when the image defect was created by observing which timing marks start or stop at the same location as the defect in the image or which components or combinations thereof were operating when the defect was formed. This technique may be used, for example, in determining that a motor and clutch timing relationship was incorrect. Additional information can be gained by experimentally varying the timing relationship and observing the image defect moved to a different location and become more or less noticeable. It is also important to note that if any variation in machine operation exists within each cycle of a three-color process, the timing marks can be examined on their respective separations to determine the colors associated with the defect. A timing mark that was consistent for each pass of a three-color cycle would contain all three colors and appear as a black mark. However, if any variation existed in the start or stop during one of the three color cycles, the resulting timing mark would not contain all colors and, therefore, would not appear black. Analysis of the color change would determine when the variation occurred. Instead of viewing only the final color image, each color separation can be reviewed to determine the extent that the defect and the corresponding activation of the machine component or components associated with the defect in the image.

Figure 3:
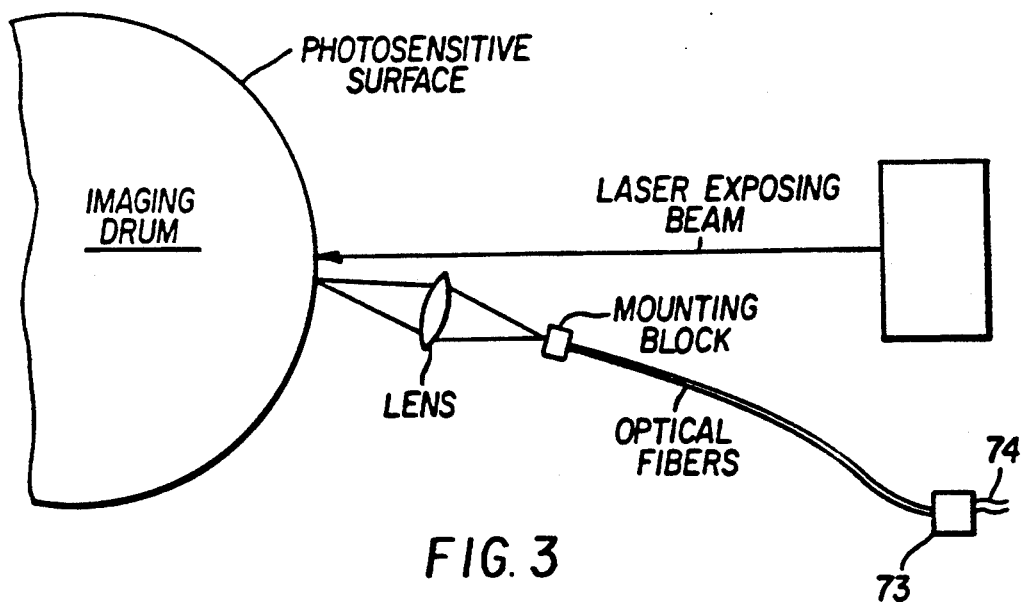
FIG. 3 illustrates another embodiment that uses a lens to image the light from the ends of the fibers onto the photosensitive surface.
Figure 4:
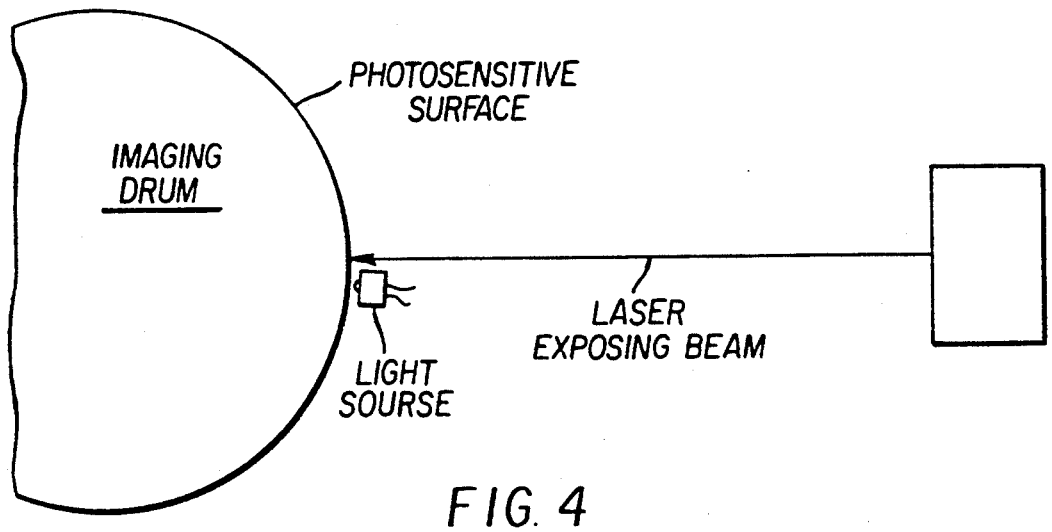
FIG. 4 illustrates yet another embodiment that uses the light sources directly without the need of the optical fibers.
Figure 5:
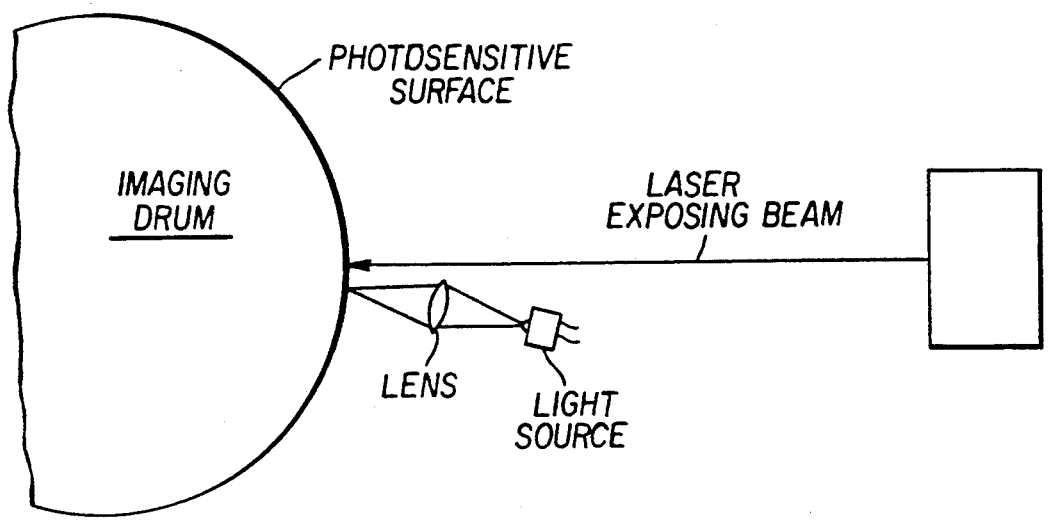
FIG. 5 illustrates a further embodiment that uses a lens to image the light sources on the photosensitive surface.
Figure 7:
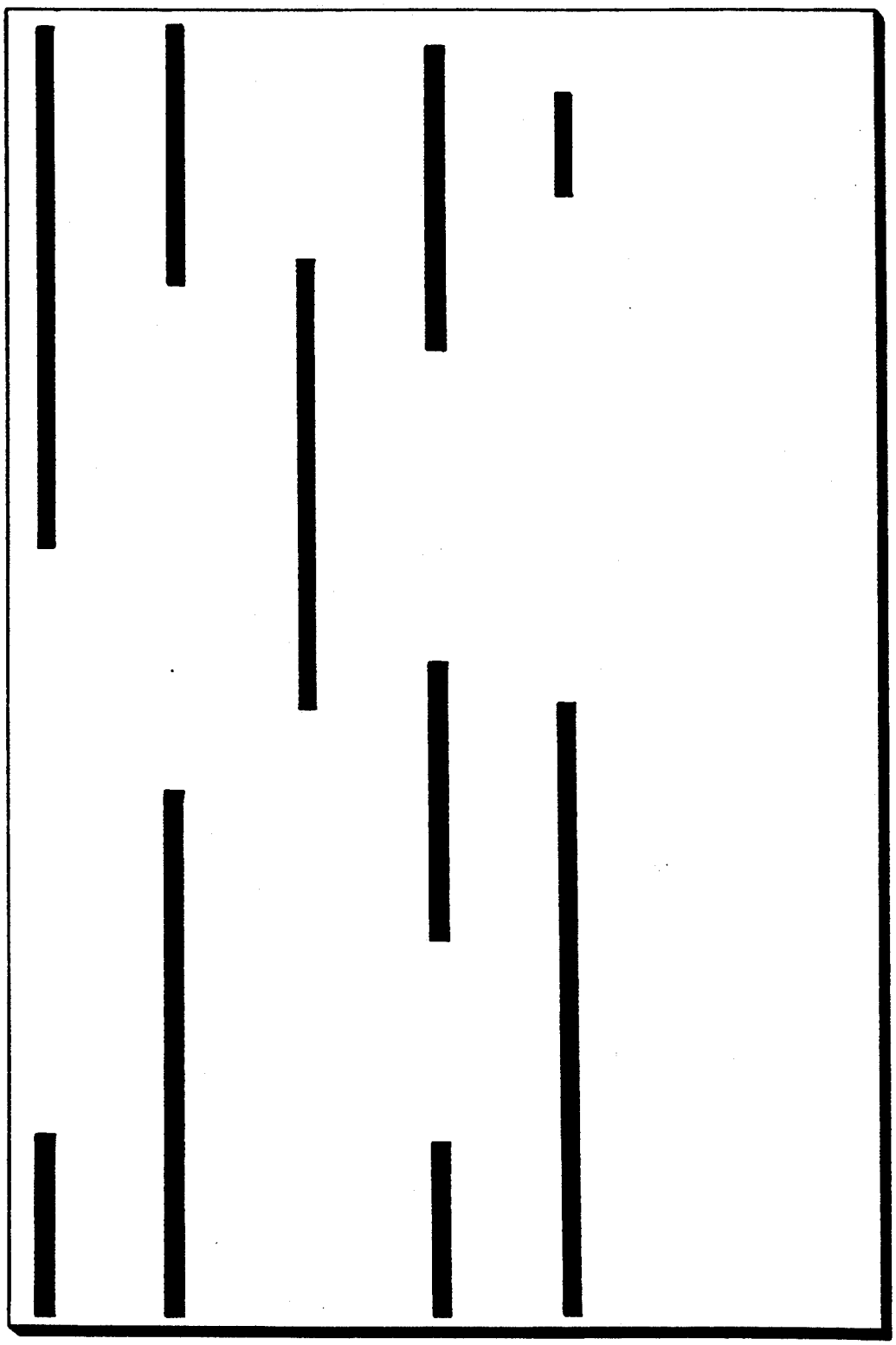
FIG. 7 illustrates a typical timing diagram according to the present invention wherein each dark mark represents a different active machine component.

FIGS. 3, 4 and 5 illustrate alternative embodiments of the present invention. For example, in FIG. 3, a simple lens system is incorporated with the fiber optics to direct light onto the photosensitive surface of the drum. FIG. 4 shows an alternative embodiment with the light source mounted adjacent the surface of the photosensitive drum. FIG. 5 incorporates the use of a simple lens with the light source to focus the light onto the photosensitive surface of the drum and thereby moving the light source to a somewhat more remote location.

In each case, the light source is connected to the logic and control unit which then controls both the machine control signals and the light associated to monitor that function. It is the command signals from the logic and control unit that turn on or off various devices like pressure valves and motors or sensor signals going to the main controller that detect an event like a photosensor and limit switch. With the fiber cable or light source mounted close to the photosensitive surface of the drum, stripes of light and dark marks are exposed on the photoconductor as the machine is operated and as the various machine components are turned on and off. When transferred to a paper, a permanent record of the timing relationships appear that is directly related to the position of the copy image when the various activations occur.

Figure 9:
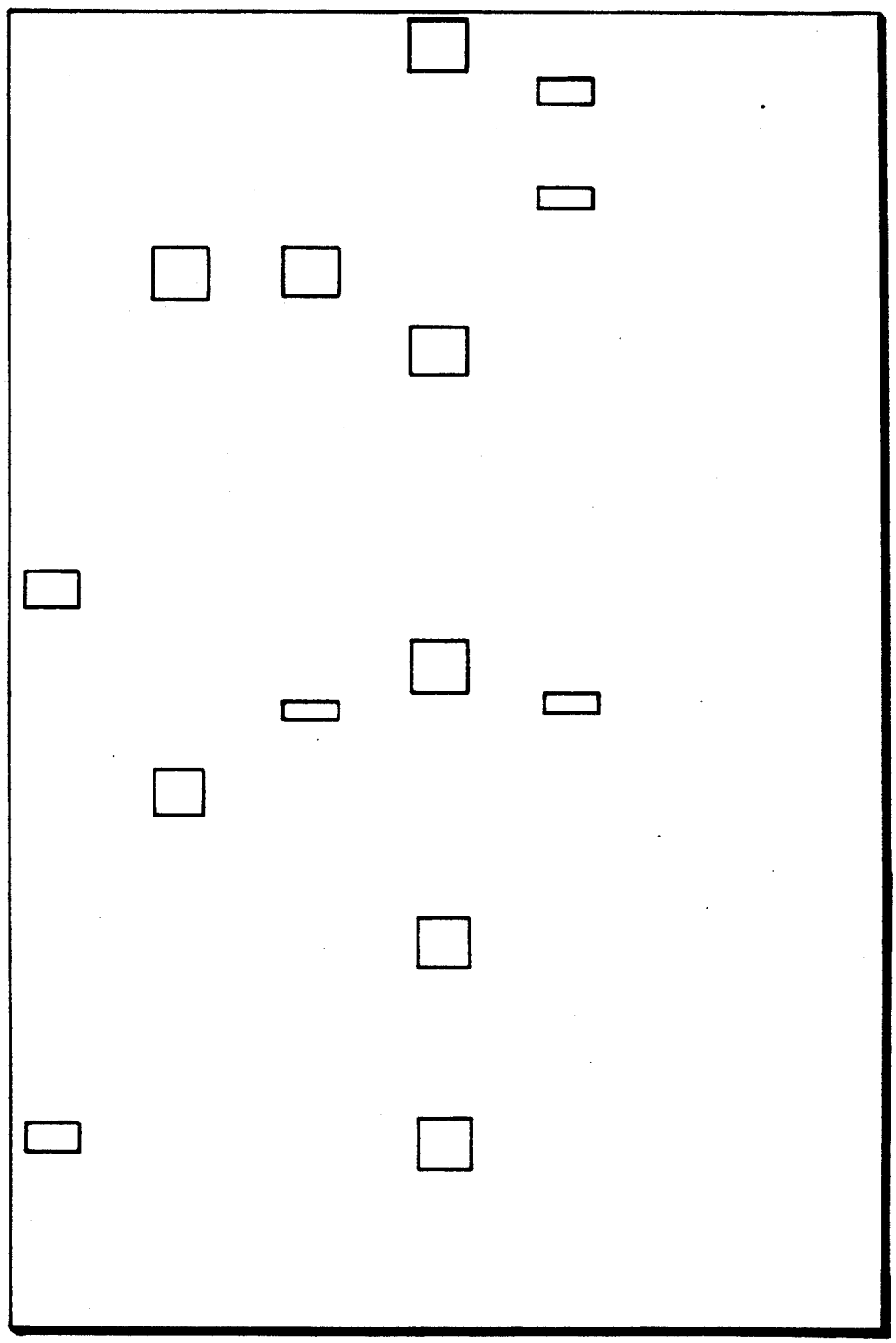
FIG. 9 illustrates a diagnostic transparent template that is pre-printed with tolerance limits for each timing mark that gives a range for the activation or inactivation of a corresponding component.
Figure 10:
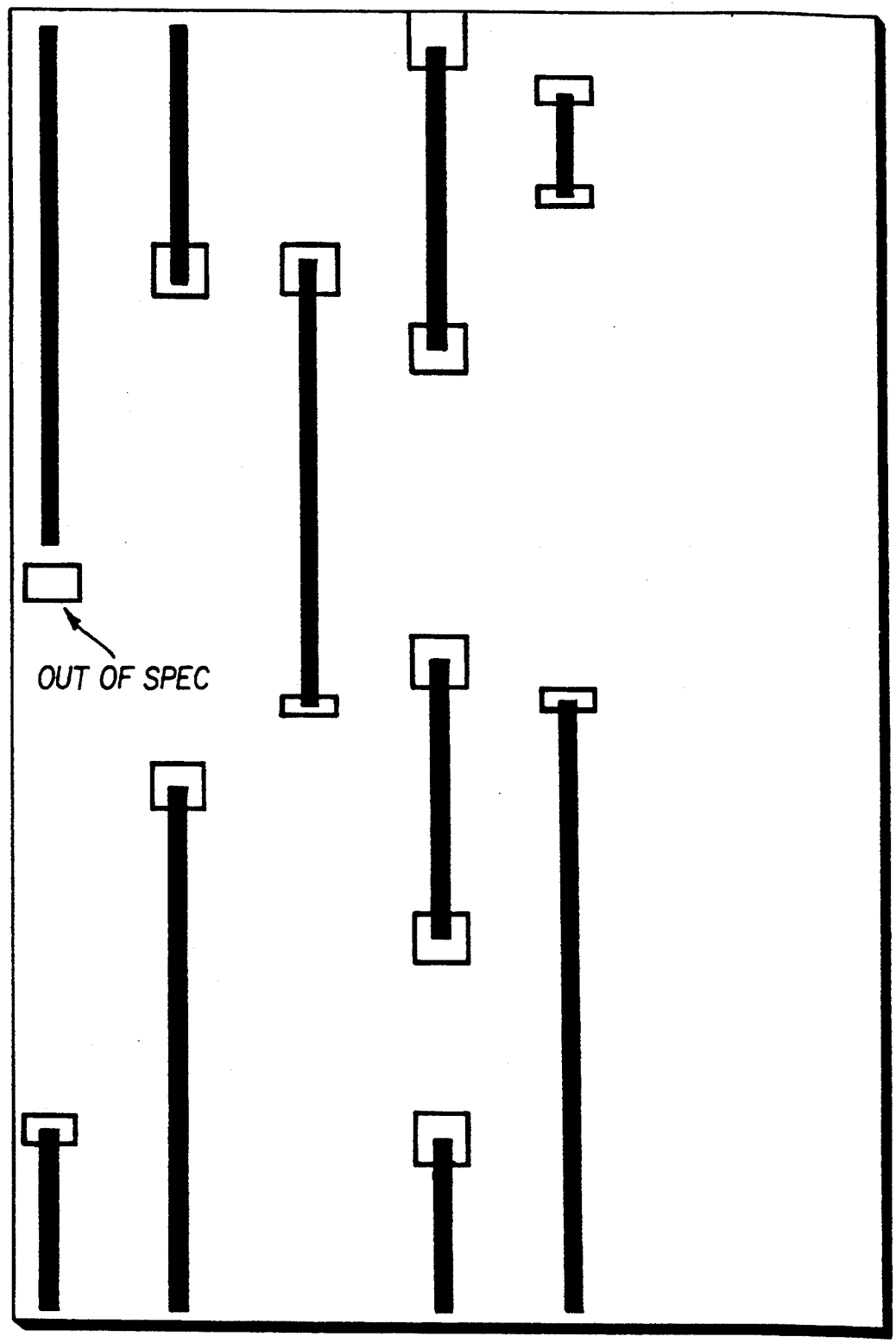
FIG. 10 illustrates the diagnostic transparent template placed over an optically generated timing diagram. The insert shows an out-of-specification condition for the activation of a machine component.

Another method of applying the present invention for diagnostic use is to generate a template made of a transparent material that has pre-printed thereon marking that would establish limits or tolerances for occurrence of the associated component activation as shown in FIG. 9. The transparent template would carry printed timing marks such as lines or boxes associated with each of the respective timing marks representing component activation. When the template is placed over a sheet containing the timing marks associated with a particular machine, the ends of each mark are inspected visually to see if it begins and ends within the prescribed limits imprinted on the transparent overlay as shown in FIG. 9. FIG. 10 illustrates the transparent overlay placed on the timing diagram generated by the machine being evaluated diagnostically using the present invention. It should be noted that all of this type of diagnostic evaluation can be done without using any additional computers, large memories or sophisticated instruments.

The invention has been described in detail with particular reference to a preferred embodiment thereof, but it will be understood that variations and modifications can be effected within the spirit and scope of the invention and as set forth in the claims.

I claim:

1. A diagnostic apparatus for use in an electronic printer or reproduction machine having a movable imaging member capable of receiving an image and means for writing an image on said imaging member, said apparatus comprising:
   a plurality of light sources adjacent said imaging member;
   means for illuminating a light source in response to the activation of at least one machine component; and
   said light source making a plurality of lines on the image with the length of each line representing the time that the activation of said machine component whereby defects in the image can be compared with the elapsed time associated with the activation of said machine component as a potential cause of said defect.

2. A method of identifying the possible cause of defects in an image formed by an electronic printer or reproduction machine having a movable imaging member capable of receiving an image from a modulated light source, said method comprising the steps of:
   activating select ones of a plurality of light sources, located adjacent said movable imaging member in response to the activation of at least one machine component and
   analyzing the plurality of lines superimposed on the image wherein the length of each line represents the elapsed time that the machine component was activated to determine if the image defects correspond to the activation of said machine component.

3. A method of identifying out of tolerance component operation in an electronic printer or reproduction machine having a movable imaging member capable of receiving an image from a modulated light source, said method comprising the steps of:
   activating select light sources, located adjacent said movable imaging member in response to the activation of respective machine components;
   comparing the formed image of vertical lines with the image generated by a standardized machine; and
   superimposing the standardized image over the formed image to determine any deviations that may exist.

4. A method as set forth in claim 3 wherein said image generated by the standardized machine also includes tolerance ranges for said component activation.

* * * * *